US012305936B2

(12) United States Patent
Zhang

(10) Patent No.: US 12,305,936 B2
(45) Date of Patent: May 20, 2025

(54) HEAT EXCHANGER FOR AN INTERNAL COMBUSTION ENGINE, HAVING A STIFFENING ELEMENT IN THE REGION OF A JOIN BETWEEN TWO PARTITIONS, AND INTERNAL COMBUSTION ENGINE HAVING A HEAT EXCHANGER

(71) Applicant: Bayerische Motoren Werke Aktiengesellschaft, Munich (DE)

(72) Inventor: Oliver Bichi Zhang, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 170 days.

(21) Appl. No.: 17/928,357

(22) PCT Filed: Jun. 30, 2021

(86) PCT No.: PCT/EP2021/068005
§ 371 (c)(1),
(2) Date: Nov. 29, 2022

(87) PCT Pub. No.: WO2022/022934
PCT Pub. Date: Feb. 3, 2022

(65) Prior Publication Data
US 2023/0313764 A1     Oct. 5, 2023

(30) Foreign Application Priority Data

Jul. 31, 2020   (DE) .................... 10 2020 120 332.2

(51) Int. Cl.
*F28F 9/007*    (2006.01)
*F02M 26/32*   (2016.01)
(Continued)

(52) U.S. Cl.
CPC .......... *F28F 9/0075* (2013.01); *F02M 26/32* (2016.02); *F28D 9/0031* (2013.01); *F28F 9/0221* (2013.01); *F28F 2225/04* (2013.01)

(58) Field of Classification Search
CPC ... F02M 26/32; F28D 9/0031; F28D 21/0003; F28D 2021/008; F28F 9/0075; F28F 9/0221; F28F 2225/04
See application file for complete search history.

(56) References Cited

U.S. PATENT DOCUMENTS 2,462,421 A    2/1949  Pitt
4,125,153 A    11/1978 Stoneberg
(Continued)

FOREIGN PATENT DOCUMENTS

DE   10 2006 057 314 A1   8/2007
DE   10 2016 210 261 A1   12/2017
(Continued)

OTHER PUBLICATIONS

International Search Report (PCT/ISA/210) issued in PCT Application No. PCT/EP2021/068005 dated Oct. 6, 2021 with English translation (four (4) pages).
(Continued)

*Primary Examiner* — Eric S Ruppert
*Assistant Examiner* — Hans R Weiland
(74) *Attorney, Agent, or Firm* — Crowell & Moring LLP

(57) ABSTRACT

A heat exchanger includes a housing wall and interior having a fluid inlet region for the introduction of a first into the interior, and at least two partitions accommodated in the interior and connected to the wall at at least one connection region. The partitions are connected to one another at a joining region. A stiffening element which, in order to stiffen a stiffening portion of the joining region adjoining the connection region, is arranged at the joining region and is
(Continued)

configured to brace the stiffening portion at least against a buckling load arising from a change in length in the event of a temperature-induced change in length of the joining region.

11 Claims, 3 Drawing Sheets

(51) Int. Cl.
*F28D 9/00* (2006.01)
*F28F 9/02* (2006.01)

(56) References Cited

U.S. PATENT DOCUMENTS

| | | | | |
|---|---|---|---|---|
| 5,661,906 A * | 9/1997 | Beier | ............... | F28D 9/0037 |
| | | | | 29/890.039 |
| 6,516,874 B2 * | 2/2003 | Mathur | ............... | F28D 9/0037 |
| | | | | 165/170 |
| 9,134,073 B2 * | 9/2015 | Malugani | ............... | F28D 9/0037 |
| 2006/0201660 A1 * | 9/2006 | Watanabe | ............... | F28D 9/0037 |
| | | | | 165/157 |
| 2006/0219394 A1 * | 10/2006 | Martin | ............... | F28D 9/0043 |
| | | | | 165/157 |
| 2007/0131404 A1 | 6/2007 | Overbury et al. | | |
| 2009/0065184 A1 * | 3/2009 | Miyagawa | ............... | F28F 3/025 |
| | | | | 165/164 |
| 2010/0044019 A1 * | 2/2010 | Maeda | ............... | F28D 7/0041 |
| | | | | 165/151 |
| 2011/0168370 A1 * | 7/2011 | Garret | ............... | F28F 9/001 |
| | | | | 165/158 |
| 2017/0067417 A1 | 3/2017 | Kim | | |

FOREIGN PATENT DOCUMENTS

| | | |
|---|---|---|
| EP | 3 150 950 A1 | 4/2017 |
| EP | 3 270 085 A1 | 1/2018 |
| JP | 2015-105818 A | 6/2015 |
| KR | 10-1569820 B1 | 11/2015 |

OTHER PUBLICATIONS

German-language Written Opinion (PCT/ISA/237) issued in PCT Application No. PCT/EP2021/068005 dated Oct. 6, 2021 (six (6) pages).

German-language Office Action issued in German Application No. 10 2020 120 332.2 dated Mar. 5, 2021 (five (5) pages).

Korean-language Office Action issued in Korean Application No. 10-2022-7041400 dated Sep. 30, 2024 with English translation (10 pages).

* cited by examiner

HEAT EXCHANGER FOR AN INTERNAL COMBUSTION ENGINE, HAVING A STIFFENING ELEMENT IN THE REGION OF A JOIN BETWEEN TWO PARTITIONS, AND INTERNAL COMBUSTION ENGINE HAVING A HEAT EXCHANGER

BACKGROUND AND SUMMARY

The invention concerns a heat exchanger for an internal combustion engine, for transferring heat between at least two fluids. A further aspect of the invention concerns an internal combustion engine having a heat exchanger.

Such heat exchangers serve to transfer heat between fluids. For example, so-called oil-coolant exchangers are normally used to cool engine oil of an internal combustion engine. On cold starting of the internal combustion engine, these oil-coolant heat exchangers may also be used to heat the engine oil, thereby accelerating the heat circulation of the internal combustion engine. Heat exchangers for internal combustion engines may also directly contribute to low-emission operation of the internal combustion engine. One example is cooled exhaust gas recirculation, or EGR, in which a part quantity of an exhaust gas emitted during operation of the internal combustion engine is taken from an exhaust tract of the internal combustion engine, cooled by means of a heat exchanger configured as an EGR cooler, and then supplied to an inlet tract of the internal combustion engine. This cooled part quantity of exhaust gas then enters the respective combustion chambers of the internal combustion engine and serves as a so-called ballast gas for combustion of an air-fuel mixture, whereby NOx emissions can be significantly reduced.

DE 10 2016 210 261 A1 describes a heat exchanger for transferring heat between a first fluid and a second fluid, wherein the first fluid can flow through the heat exchanger from a first end face to a second end face. The heat exchanger has at least two partitions which separate flow regions for the first fluid and the second fluid inside the heat exchanger. At least two adjacent partitions each have a connecting region on at least one end face of the heat exchanger, at which they are connected together via a connection. The connection has at least one opening in the end face.

It is an object of the present invention to provide a heat exchanger and an internal combustion engine of the type cited initially which allow a particularly failure-proof transfer of heat between fluids.

This object is achieved by a heat exchanger and by an internal combustion engine having the features of the independent claims. Advantageous embodiments and suitable refinements of the invention are given in the dependent claims.

A first aspect of the invention concerns a heat exchanger for an internal combustion engine, for transferring heat between at least two fluids,
with at least one housing having at least one housing wall and a housing interior which is delimited at least in regions by the housing wall, and which has a fluid inlet region for introduction of a first fluid of the at least two fluids into the housing interior and a fluid outlet region for discharge of the first fluid from the housing interior,
with at least two partitions which are at least predominantly accommodated in the housing interior and which are connected to the housing wall of the housing in at least one connecting region, and which, in order to separate the fluids from one another, at least in regions delimit a fluid-receiving space through which a second of the at least two fluids can flow, wherein the at least two partitions are connected to one another at least at a joining region which is assigned to the fluid inlet region and adjoins the fluid-receiving space in a main fluid flow direction of the first fluid.

The fluids may for example be exhaust gas and coolant, in particular cooling water. The first fluid may for example be an exhaust gas while the second fluid may be a coolant. The fluid outlet region may lie opposite the fluid inlet region in the main fluid flow direction of first fluid. The term "main fluid flow direction" means the flow direction of the first fluid in which the first fluid may mostly flow on correct use of the heat exchanger.

On correct use of the heat exchanger, the first fluid enters the housing interior at the fluid inlet region and leaves the housing interior at the fluid outlet region. In addition, on correct use of the heat exchanger, the second fluid is conducted into the fluid-receiving space and received therein. In order to achieve a maximum heat transfer coefficient, it is particularly advantageous to conduct the fluid with formation of a respective turbulent flow of both the first fluid and also the second fluid through the heat exchanger. Between the fluid inlet region and the fluid outlet region, an efficient heat transfer through the respective partitions may take place between the first fluid and the second fluid conducted in the fluid-receiving space.

The main fluid flow direction may be oriented in the longitudinal extent direction of the heat exchanger. Thus the fluid outlet region may lie opposite the fluid inlet region in the longitudinal direction of the heat exchanger. The fluid-receiving space may extend between the at least two partitions, whereby the second fluid which can be conducted into the fluid-receiving space can be effectively and reliably kept separate from the first fluid. The heat transfer between the two fluids may in particular take place by thermal conduction through the respective partitions. In particular, the first fluid may flow along sides of the fluid-receiving space lying opposite one another perpendicularly to the main fluid flow direction (of the first fluid), e.g. along the main fluid flow direction, to the left and right of the fluid-receiving space in the viewing direction, and thus exchange heat via the respective partitions with the second fluid conducted in the receiving space. The expression that "the at least two partitions delimit the fluid-receiving space at least in regions", means that the fluid-receiving space may be delimited not exclusively by the partitions but also for example in regions by the housing wall.

The phrase "joining region assigned to the fluid inlet region" may mean that the joining region may be situated at least in the vicinity of the fluid inlet region, e.g. may face the fluid inlet region, and additionally or alternatively may be arranged in the fluid inlet region.

According to the invention, it is provided that the heat exchanger comprises at least one stiffening element which, in order to stiffen at least in regions at least one stiffening portion of the joining region adjoining the connecting region, is arranged at the joining region and is designed to brace the stiffening portion at least against a buckling load induced by a change of length in the even of a temperature-related length change of the joining region.

This is advantageous since it may relieve the load on the connecting region. A bracing against buckling load may in particular prevent lateral buckling, for example in the form of a bulging deformation, in the stiffening portion. For clarification: an at least approximately comparable bulging deformation is known for example from an Euler buckling rod, in which the buckling rod is mounted at its two rod ends.

The stiffening portion may particularly preferably directly adjoin the connecting region. This may substantially reduce the mechanical stresses caused by length changes at the connecting region on the stiffening element which braces the stiffening portion against buckling load, whereby however a slight and hence harmless mechanical load of the connecting region occurs.

If, during operation of the heat exchanger, temperature-related length changes of the joining region occur because the first fluid meets the joining region at the fluid inlet region with a particularly high fluid temperature and/or high transient fluid flow speed of the first fluid, and thereby heats the joining region greatly, then buckling of the stiffening portion due to the length change may be prevented by means of the stiffening element.

In particular, even at high temperatures of the first fluid on meeting the joining region, the occurrence of any stress cracks at the connecting region and associated leaks may be avoided, whereby a particularly failure-proof transfer of heat between the fluids is possible in the long term.

In the regions adjoining at least one joining region in the main fluid flow direction, the at least two partitions may be free from the at least one stiffening element. In other words, it may be provided that the stiffening element extends exclusively over the joining region at least in regions; this does not exclude that further joining regions, for example a second joining region which may be spaced from the joining region in the main fluid flow direction and for example assigned to the fluid outlet region, may also have such a stiffening element, namely a second stiffening element.

The stiffening element may in principle be formed as a sheet metal component, whereby the stiffening element can easily be produced and also compactly arranged on the stiffening portion.

The invention is based on the knowledge that the connecting region which the partitions are at least indirectly, and preferably directly, connected to the housing wall, is particularly susceptible to damage from thermal stresses. Accordingly, it has been found that the impact of the first fluid, in particular with high transient fluid flow speed changes and with high fluid temperature of the first fluid, on the joining region and the associated temperature-related length change of the joining region, may lead to damage of the connecting region. The invention here proposes that the stiffening element creates an in particular locally delimited and hence targeted stiffening, at which the undesired buckling due to temperature-related length change may be suppressed in targeted fashion.

In an advantageous refinement of the invention, the stiffening element at least in regions surrounds the at least two partitions at the stiffening portion. This is advantageous since the partial surrounding gives a particularly secure bracing against buckling load, and also buckling towards mutually opposite sides can be effectively suppressed.

In a further advantageous refinement of the invention, the stiffening element clamps the at least two partitions at the stiffening portion. This is advantageous since clamping gives a particularly tight seat of the stiffening element on the partitions. In this way, the stiffening element can be mounted particularly captively on the partitions and in some cases also then connected by substance bonding to the partitions, in particular by soldering. The stiffening element may in particular have an undersize, so that the stiffening element in this arrangement may be clamped to the two partitions at the stiffening portion.

In a further advantageous refinement of the invention, the joining region comprises a joining region portion without stiffening element. It is advantageous here that, in this way, a targeted deformation induced by length changes at the joining region portion may be permitted. The joining region portion may deform with particularly low resistance, which relieves the load at the connecting regions. The stiffening element may thus limit the deformation to the joining region portion in targeted fashion, while the stiffening portion can be protected from deformation by the stiffening element. The expression "without stiffening element" means that the joining region portion may be excluded from stiffening by the stiffening element. In other words, the joining region portion is then not stiffened by means of the stiffening element and hence not braced by means of the stiffening element.

In a further advantageous refinement of the invention, the stiffening element has a tapering region at which the stiffening element tapers in the direction of the joining region portion without stiffening element. This is advantageous since the taper can exclude or at least greatly reduce any sudden stiffness changes along the joining region. This particularly increases the durability under temperature-related length change. The taper may be configured such that the stiffening element is e.g. pointed in the direction of the joining region portion.

In a further advantageous refinement of the invention, the stiffening element is connected by substance bonding to at least one of the at least two partitions. This may create a particularly high stiffness of the joining region and a reliable connection between the stiffening element and the joining region. A particularly durable connection can be achieved if the stiffening element is connected by substance bonding, in particular is soldered, to both partitions.

In general, for example a gap formed between the partitions and extending along the joining region may have an even gap width which is easy to seal. The gap may for example be filled with a metal solder (e.g. tin solder) and the partitions thereby joined together at the joining region.

In a further advantageous refinement of the invention, the at least two partitions are connected to the housing wall at the connecting region in a T-shaped butt joint. This is advantageous since the T-shaped butt joint can be created at particularly low production cost. A T-shaped butt joint may mean that the two partitions and the housing wall may form a T-shape at the connecting region in a sectional plane which is oriented perpendicularly to the main fluid flow direction.

Each of the partitions may have at least one partition region oriented along the housing wall and preferably away from the joining region, at which the respective partition may be connected, preferably by substance bonding, to the housing wall. Particularly preferably, the partitions may each have two mutually opposing partition regions which may each be soldered to the housing wall.

In further advantageous refinement of the invention, the stiffening element is connected by substance bonding to at least one of the at least two partitions and/or to the housing wall at the connecting region. In this way, a particularly high stiffness can be achieved at the connecting region. The substance bonding of the partition, preferably both partitions, at the connecting region via the stiffening element, may achieve a direct bracing of the partition/partitions at the connecting region via the stiffening element, and hence give the connecting region a particularly high stiffness. The substance bonding of the stiffening element to the housing wall may at least partially brace the housing wall against buckling load by means of the stiffening element, and thereby relieve the load on the connecting region. A particularly high stiffness may accordingly be achieved if the stiffening element is connected to the two partitions and to the housing wall by substance bonding at the connecting region.

A second aspect of the invention concerns an internal combustion engine with a heat exchanger according to the first aspect of the invention. The internal combustion engine equipped with this heat exchanger allows a particularly failure-proof transfer of heat between fluids.

In an advantageous refinement of the invention, the heat exchanger is configured as an exhaust gas cooler of the internal combustion engine. With the heat exchanger configured as an exhaust gas cooler, in particular an EGR cooler, a particularly failure-proof transfer of heat is possible between the exhaust gas as the first fluid and coolant as the second fluid.

The preferred embodiments presented for one of the aspects and their advantages apply accordingly to the respective other aspects of the invention, and vice versa.

The features and feature combinations cited in the description above, and the features and feature combinations cited in the following description of figures and/or simply shown in the figures, may be used not only in the respective combination given but also in other combinations or alone, without leaving the scope of the invention.

Further advantages, features and details of the invention arise from the claims, the following description of preferred embodiments, and the drawings.

The invention is explained again in more detail with reference to a concrete exemplary embodiment below.

DETAILED DESCRIPTION OF THE DRAWINGS

Figure 1:
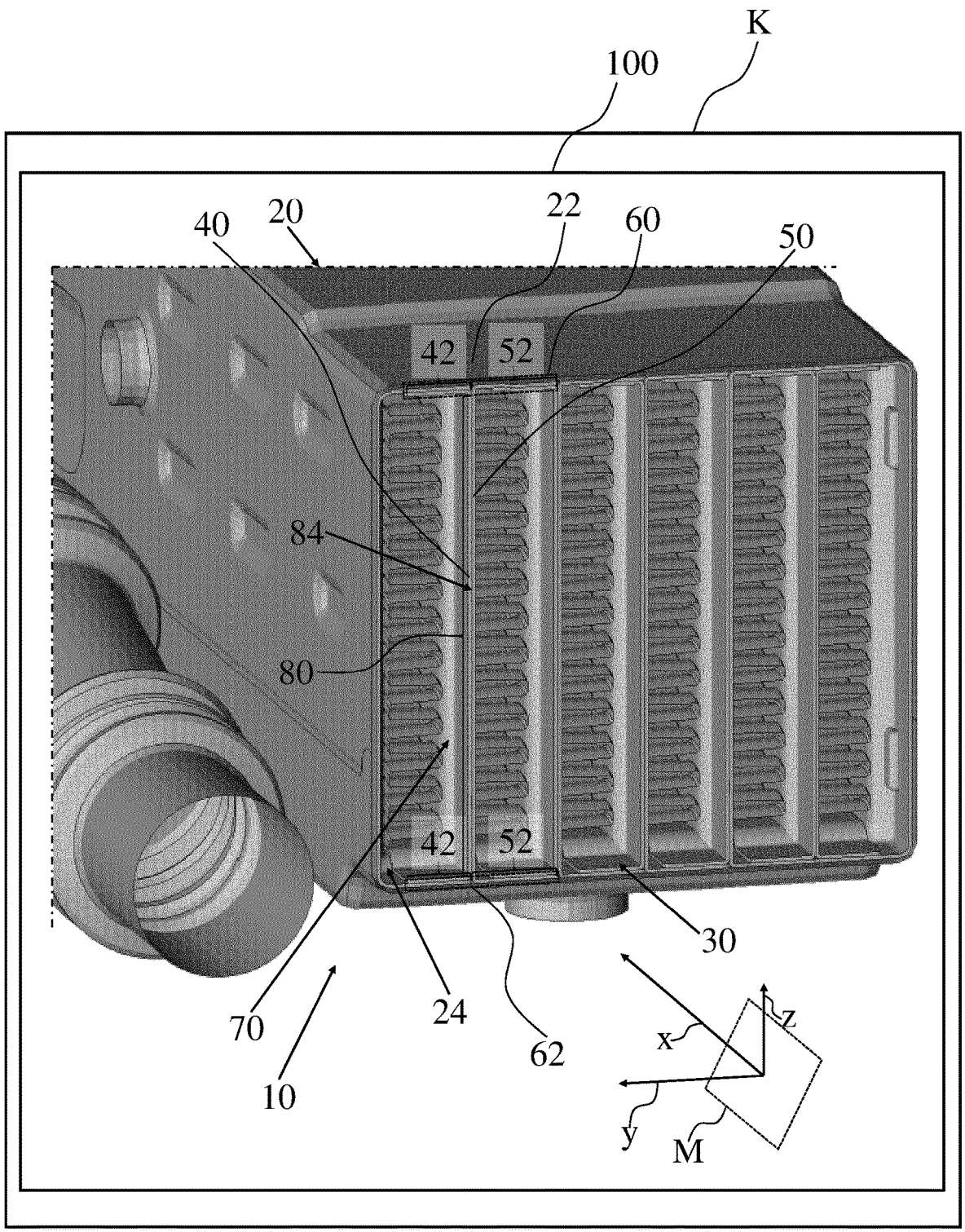
FIG. 1 is a perspective sectional illustration of a heat exchanger (shown in extract) of an internal combustion engine, which serves for transfer of heat between two fluids, of which a first fluid is an exhaust gas and a second fluid a coolant of the internal combustion engine, wherein the internal combustion engine, illustrated in highly abstract form, is assigned to a vehicle, also illustrated in highly abstract form.
Figure 2:
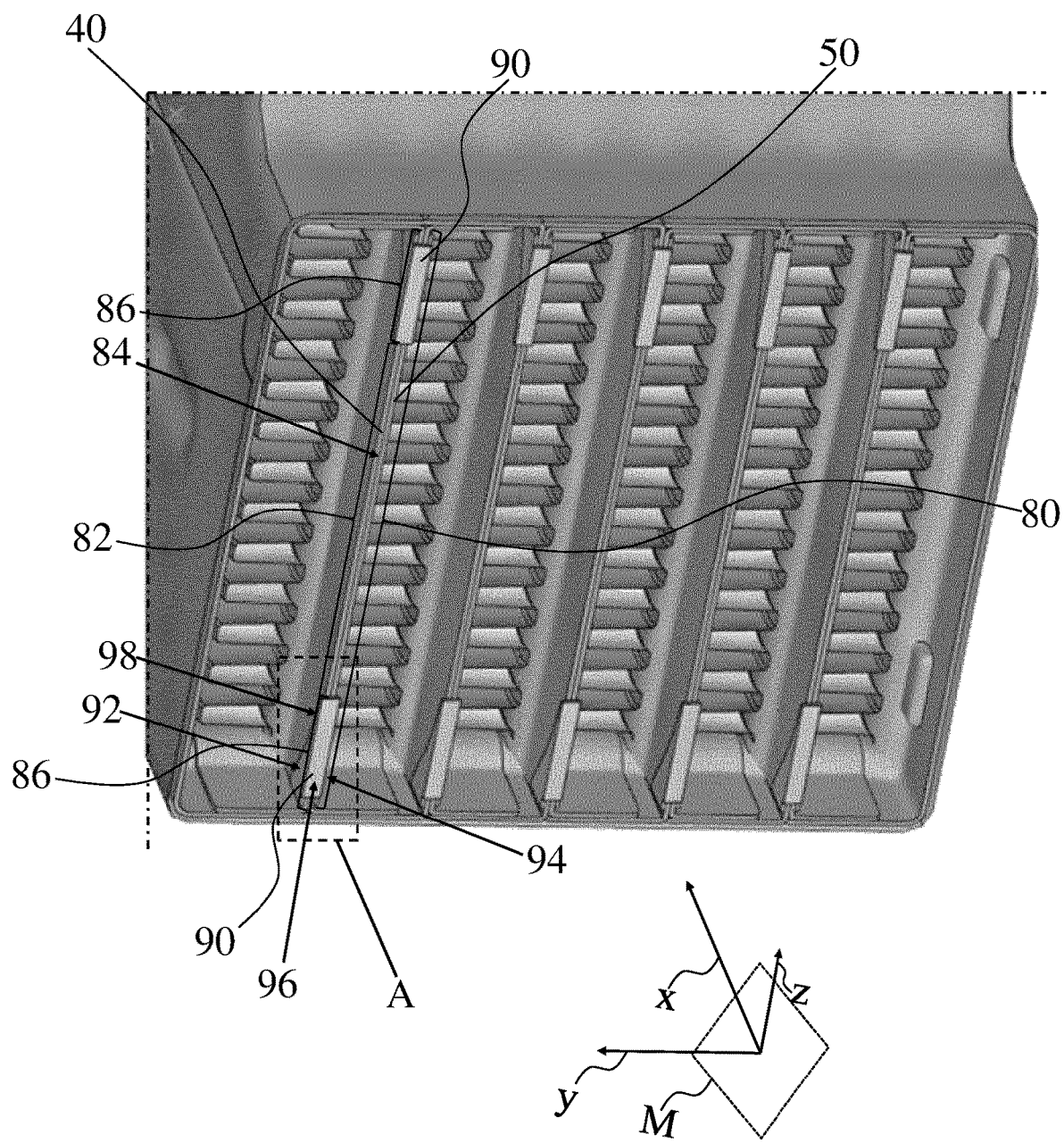
FIG. 2 is an enlarged view of a segment of the heat exchanger shown in FIG. 1.

FIG. 1 shows a schematic illustration of a motor vehicle K, with an also schematically illustrated internal combustion engine 100 which is configured to drive the motor vehicle K. The internal combustion engine 100 comprises a heat exchanger 10 which is configured as an exhaust gas cooler, namely an EGR cooler of the internal combustion engine 100. By means of the heat exchanger 10, a so-called cooled exhaust gas recirculation is possible during operation of the internal combustion engine 100. FIG. 2 shows an enlarged illustration of a segment of the heat exchanger shown in FIG. 1

The heat exchanger 10 serves to transfer heat between two fluids. A first fluid of the two fluids is in this case an exhaust gas, while a second fluid of the two fluids is in this case a coolant, for example in the form of a water-antifreeze mixture.

The heat exchanger 10 (here the EGR cooler) comprises a housing 20 with at least one housing wall 22. In this case, the housing wall 22 is formed as a sheet metal part and may also be described as a cooling jacket.

The housing wall 22 peripherally delimits a housing interior 24 of the housing. The housing interior 24 has a fluid inlet region 30 for introduction of the first fluid into the housing interior 24, and a fluid outlet region for discharge of the first fluid from the housing interior 24. The fluid outlet region (not shown further here) is arranged downstream of the fluid inlet region in a main fluid flow direction x of the first fluid. The main fluid flow direction x corresponds to a longitudinal direction of the heat exchanger 10. In other words, on correct use of the heat exchanger 10, the first fluid flows through the housing interior 24 in the longitudinal direction of the heat exchanger 10.

As also evident from FIG. 1 and FIG. 2, in the present case the heat exchanger is configured as a plate heat exchanger.

The plates of the heat exchanger 10 are formed by pairs of interconnected partitions 40, 50, namely a first partition 40 and a second partition 50, in the present case each formed as sheet-metal half shells. A plate is thus formed by the first partition 40 and the second partition 50, wherein the heat exchanger 10 has a plurality of such plates, as evident in FIG. 1. Only a single plate formed by the two partitions 40, 50 is discussed below, but in principle the statements below also apply to the other plates of the heat exchanger 10.

The partitions 40, 50 are received in the housing interior 24 and connected to the housing wall 22 at connecting regions 60, 62 lying opposite one another in a height (vertical) direction z of the heat exchanger 10. The first partition 40 has respective partition regions 42 opposite one another in the height direction z, while the second partition 50 has partition regions 52 opposite one another in the height direction z. The respective partition regions 42, 52 are molded onto the housing wall 22. In other words, at the corresponding connecting regions 60, 62, the partition regions 42, 52 run at least largely parallel to the housing wall 22 and in this case also parallel to one another, and are connected to the housing wall 22 at the connecting regions 60, 62 by substance bonding, in particular by a solder connection.

The partitions 40, 50 serve to separate the fluids from one another and, on correct use of the heat exchanger 10, at least in regions delimit a fluid-receiving space 70 through which the second fluid (here coolant) flows. The fluid-receiving space 70 is also delimited by the housing wall 22 in regions, namely in the height direction z of the heat exchanger 10 oriented perpendicularly to the main fluid flow direction x. The fluid-receiving space 70 is covered by the partitions 40, 50 in all FIGS. 1 to 3 and therefore not visible, but it is quite clear how the respective partitions 40, 50 formed as sheet-metal half shells may delimit the fluid-receiving space 70. Thus each of the sheet-metal half shells (partitions 40, 50) may delimit around half the fluid-receiving space 70.

The pairs of partitions 40, 50 are in each case connected together by substance bonding, and here soldered, at least at a joining region 80 assigned to the fluid inlet region 30 and adjoining the fluid-receiving space 70 in the main fluid flow direction x of the first fluid. A gap 84 extending over the joining region 80 between the partitions 40, 50 is filled with metal solder, whereby the partitions 40, 50 are soldered together and the gap 84 sealed against an undesired escape of the second fluid (coolant, in particular cooling water) from the fluid-receiving space 70 extending between the partitions 40, 50. In addition, the partitions 40, 50 are also connected together at a further joining region opposite the joining region 80 in the main fluid flow direction x and assigned to the fluid outlet region, but this is not however visible in all FIGS. 1 to 3 since the fluid outlet region is not shown.

The respective partitions 40, 50 are oriented towards the respective partition regions 42, 52 at the common joining region 80 at an angle, namely in this case a right angle (90°). The partitions 40, 50 are thereby connected to the housing wall 22 at the connecting regions 60, 62 in a T-shaped butt joint, as particularly evident in FIG. 2.

Figure 3:
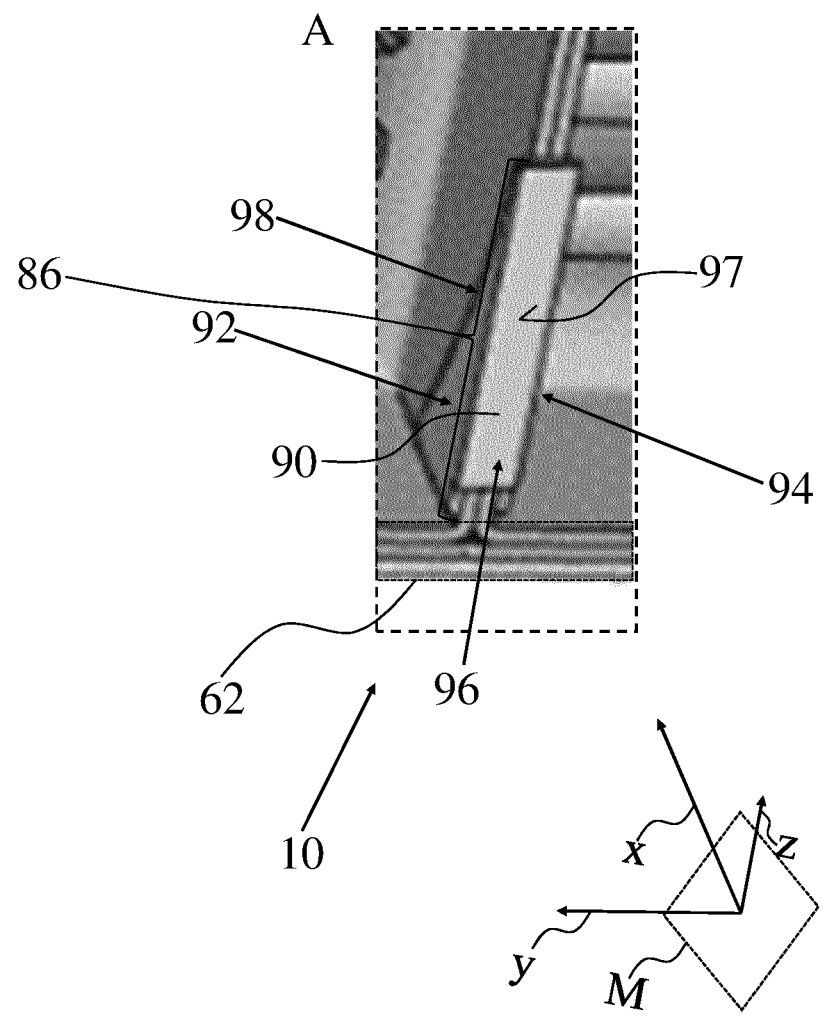
FIG. 3 is an enlarged illustration of a region A, outlined in dotted lines in FIG. 2, which shows a stiffening element in enlarged perspective view.

It is clear from FIG. 2 and FIG. 3 that the heat exchanger 10 comprises a plurality of stiffening elements 90 which are arranged at the joining region 80 for at least regional stiffening of stiffening portions 86 of the joining region 80 adjoining the connecting regions 60, 62. The stiffening elements 90 are designed to brace the respective stiffening portions 86 at least against a buckling load induced by a change of length in the event of a temperature-related length change of the joining region 80. The bracing against buckling load may in particular prevent a lateral buckling in the form of a bulging or wavy deformation in the region of the stiffening portions 86. An illustration of the stiffening element 90 has been omitted in FIG. 1 purely for reasons of clarity.

In the present case, for each joining region 80 and hence each plate (comprising the partitions 40, 50), two stiffening elements 90 are arranged on stiffening portions 86 lying opposite one another in the height direction z. One of the stiffening portions 86 is assigned to the connecting region 60, and another of the stiffening portions 86 is assigned to the second connecting region 62. Thus one of the stiffening elements 90 is arranged at the connecting region 60, and one of the stiffening elements 90 (in the present example, opposite in the height direction z) is arranged on the connecting region 62.

The stiffening elements 90 surround the partitions 40, 50 at the respective stiffening portions 86 in regions, whereby an effective stiffening can be achieved at both partitions 40, 50.

In addition, the stiffening elements 90 clamp the partitions 40, 50 at the stiffening portion 86. In other words, the stiffening elements 90 each exert a clamping force on the partitions 40, 50.

It is evident from FIG. 2 that the joining region 80 comprises a joining region portion 82 without stiffening element. The joining region portion 82 extends between the mutually opposite stiffening portions 86. If a temperature-related length change of the joining region 80 occurs on correct use of the heat exchanger 10, the design of the joining region portion 82 without stiffening element allows a slight deformation caused by length change, for example in the form of a wave-like local buckling, and hence limits this in targeted fashion to this joining region portion 82, while buckling and associated mechanical stress loading in the region of the stiffening portions 86 and at the connecting regions 60, 62 can be prevented by the stiffening elements 90.

The stiffening elements 90 each have a tapering region 98 at which the respective stiffening elements 90 taper in the direction of the joining region portion 82 without stiffening element. It is clear from FIG. 3 that because of their taper, the stiffening elements 90 are pointed in the direction of the joining region portion 82. The tapering region 98 may preferably extend over the entire length of the stiffening elements 90, as can be seen in FIG. 3 in which the tapering region 98 extends over the entire length of the stiffening elements 90 in the height direction z.

The stiffening elements 90 in the present case are formed as hollow cuboids at least in regions. Each stiffening element 90 has two side wall regions 92, 94 lying opposite one another in a direction y different from the main fluid flow direction x. Of these side wall regions 92, 94, a first side wall region 92 braces the first partition 40 along the stiffening portion 86 and preferably also at one of the connecting regions 60, 62. A second side wall region 94 of the side wall regions 92, 94, lying opposite the first side wall region 92 in the direction y, braces the second partition 50 along the stiffening portion 86 and preferably also at one of the connecting regions 60, 62, as shown in FIG. 3. The side wall regions 92, 94 are integrally connected together via an end wall region 96 of the respective stiffening element 90. The end wall region 96 comprises an end face 97 facing the main fluid flow direction x (see FIG. 3). In the present case, the direction y corresponds to a transverse direction of the heat exchanger 10.

The direction y is oriented perpendicularly to a central plane M, to which the partitions 40, 50 may be oriented at least substantially parallel. The central plane M in the present case is spanned by the main fluid flow direction x and the height direction z. The main fluid flow direction x (longitudinal extent of the heat exchanger 10), the direction y (transverse direction of the heat exchanger 10), and the height direction z are each oriented perpendicularly to one another.

The stiffening elements 90 are each connected by substance bonding, in particular soldered, to the partitions 40, 50.

The respective stiffening elements 90 are connected by substance bonding to the partitions 40, 50 at the respective connecting regions 60, 62, and are at least indirectly connected to the housing wall 22. An at least indirect connection here means that the stiffening elements 90 may be substance-bonded to the partitions 40, 50 at the partition regions 42, 52, wherein the partition regions 42, 52 are in turn substance-bonded to the housing wall 22.

The stiffening elements 90 are each provided and configured to prevent any buckling, for example in the form of wave formation or bulging, resulting from mechanical stresses induced by length change at the connecting regions 60, 62, following a temperature-related length change of the joining region 80. The stiffening elements 90 thus allow a particularly failure-proof transfer of heat between the fluids.

The partitions 40, 50 are connected together by substance bonding, namely soldered, along the entire joining region 80.

The partitions 40, 50 (sheet-metal half shells) may firstly be joined together at the joining region 80 and secondly to the housing wall 82 at the connecting regions 60, 62 during production of the present heat exchanger 10. Because of minimal solder widths in the design of the heat exchanger 10, the connecting regions 60, 62 constitute particularly stiff zones of the heat exchanger 10, in particular at the fluid inlet region 30.

The stiffening elements 90 may prevent an unacceptably high mechanical load, for example in the form of a thermal shock load, at the connecting regions 60, 62. The stiffening elements 90 prevent buckling of the partitions 40, 50, which are connected to the housing wall 22 with a T-shaped butt joint, at the stiffening portions 86, whereby excessive loads on the connecting regions 60, 62 can be prevented even under high transient flows of particularly hot exhaust gas (first fluid) through the housing interior 24. The stiffening elements 90 as a whole may form a targeted local reinforcement at which buckling is suppressed even under temperature-related length change.

The geometric design of the stiffening elements 90 leads to a targeted local increase in stiffness of the sheet-metal half shells (partitions 40, 50) in the joining region 80. By means of the stiffening elements 90, therefore, the soldered sheet-metal half shells are stiffened locally within limits, whereby thermal shock loads cause less deformation at the stiffening portions 86. The stiffening portions 86 constitute respective edge regions of the joining region 80 adjoining the connecting regions 60, 62. The stresses from thermal shock loads on the connecting regions 60, 62 as a whole are relieved.

In the present heat exchanger 10, the stiffening elements 90 help prevent any stress cracks induced by temperature-related length changes in the region of the connecting regions 60, 62. In addition, the stiffening elements 90 substantially reduce any sudden stiffness changes in the T-shaped butt joint connection and extend any crack propagation paths.

The stiffening elements 90 may in general, for ease of installation, also be configured as stiffening clips. The stiffening clips may then for example be latched onto at least one of the partitions 40, 50 or both partitions 40, 50 at the stiffening portion 86.

The stiffening elements 90 may be connected, preferably soldered, to the joining region 80 during production of the heat exchanger 10.

LIST OF REFERENCE SIGNS

10 Heat exchanger
20 Housing
22 Housing wall
24 Housing interior
30 Fluid inlet region
40 First partition
42 Partition region
50 Second partition
52 Partition region
60 Connecting region
62 Second connecting region
70 Fluid-receiving space
80 Joining region
82 Joining region portion
84 Gap
86 Stiffening portion
90 Stiffening element
92 Side wall region
94 Second side wall region
96 End wall region
97 End face
98 Tapering region
100 Internal combustion engine
K Motor vehicle
M Central plane
x Main fluid flow direction
Y Direction
z Height (vertical) direction

The invention claimed is:

1. A heat exchanger for an internal combustion engine for transferring heat between at least two fluids, comprising:
a housing having a housing wall and a housing interior which is delimited at least in regions by the housing wall, and which has a fluid inlet region for introducing a first fluid of the at least two fluids into the housing interior and a fluid outlet region for discharging of the first fluid from the housing interior;
at least two partitions which are accommodated at least predominantly in the housing interior and which are connected to the housing wall of the housing in at least one connecting region, and which, in order to separate the at least two fluids from one another, at least in regions delimit a fluid-receiving space through which a second fluid of the at least two fluids flows, wherein the at least two partitions are connected to one another at least at a joining region which is assigned to the fluid inlet region and adjoins the fluid-receiving space in a main fluid flow direction of the first fluid, wherein the at least one connecting region is located at a lengthwise terminal end of the joining region along an axis perpendicular to a main fluid flow direction of the first fluid, and wherein at least one of the two partitions directly contacts and is directly connected to the housing wall at the connecting region;
at least one stiffening element which, in order to stiffen at least in regions at least one stiffening portion of the joining region adjoining the connecting region, is arranged at the joining region and is configured to brace the stiffening portion at least against a buckling load induced by a length change in an event of a temperature-related length change of the joining region.

2. The heat exchanger according to claim 1, wherein the stiffening element at least in regions surrounds the at least two partitions at the stiffening portion.

3. The heat exchanger according to claim 1, wherein the stiffening element clamps the at least two partitions at the stiffening portion.

4. The heat exchanger according to claim 1, wherein the joining region comprises a joining region portion without a stiffening element.

5. The heat exchanger according to claim 4, wherein the stiffening element has a tapering region at which the stiffening element tapers in a direction along the axis perpendicular to a main fluid flow direction of the first fluid toward the the joining region portion without the stiffening element.

6. The heat exchanger according to claim 1, wherein the stiffening element is connected by material bonding to at least one of the at least two partitions.

7. The heat exchanger according to claim 1, wherein the at least two partitions are connected to the housing wall at the connecting region in a T-shaped butt joint.

8. The heat exchanger according to claim 1, wherein the stiffening element is connected by material bonding to at least one of the at least two partitions and/or to the housing wall at the connecting region.

9. An internal combustion engine comprising a heat exchanger according to claim 1.

10. The internal combustion engine according to claim 9, wherein the heat exchanger is configured as an exhaust gas cooler of the internal combustion engine.

11. The heat exchanger according to claim 1, wherein the at least two partitions comprise a plurality of pairs of partitions that are connected together at respective joining regions, and
wherein the at least one stiffening element comprises a plurality of individual stiffening elements, each individual stiffening element connected to only one respective pair of partitions of the plurality of pairs of partitions.

* * * * *